United States Patent
Hasific et al.

(10) Patent No.: US 10,259,166 B2
(45) Date of Patent: Apr. 16, 2019

(54) REFLECTION INNER RING

(71) Applicant: Georg Fischer Rohrleitungssysteme AG, Schaffhausen (CH)

(72) Inventors: Edin Hasific, Schaffhausen (CH); Jürgen Rösch, Lenzkirch (DE)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 130 days.

(21) Appl. No.: 15/410,378

(22) Filed: Jan. 19, 2017

(65) Prior Publication Data

US 2017/0225388 A1 Aug. 10, 2017

(30) Foreign Application Priority Data

Feb. 9, 2016 (EP) .................................... 16154758

(51) Int. Cl.
*B29C 65/14* (2006.01)
*B29C 65/00* (2006.01)
*B29C 35/08* (2006.01)

(52) U.S. Cl.
CPC ...... *B29C 65/1412* (2013.01); *B29C 66/0242* (2013.01); *B29C 66/5221* (2013.01); *B29C 2035/0822* (2013.01)

(58) Field of Classification Search
CPC ............ B29C 65/1412; B29C 66/5221; B29C 66/0242
See application file for complete search history.

(56) References Cited

FOREIGN PATENT DOCUMENTS

| CH | 493323 A | * | 7/1970 | ........... B29B 13/025 |
| DE | 4416518 A1 | | 11/1995 | |
| EP | 312712 A1 | | 4/1989 | |
| JP | 3347903 B2 | * | 11/2002 | ......... B29C 65/1422 |

OTHER PUBLICATIONS

Machine Translation of JP-3347903-B2 (Year: 2002).*
Machine Translation of CH-493323-A (Year: 1970).*
European Search Report (in German) issued by the European Patent Office dated Aug. 17, 2016 regarding EP Patent Application No. 16154758.3 (8 pages).

* cited by examiner

*Primary Examiner* — Daniel McNally
(74) *Attorney, Agent, or Firm* — Harness, Dickey & Pierce, P.L.C.

(57) ABSTRACT

A device for end-side welding of plastic profiles, preferably pipes, containing tensioning devices for retaining the plastic profiles in a coaxial position in relation to one another, a heating plate for generating heat rays for contact-free heating up of the plastic profile ends and a reflection outer ring for reflection of the heat radiation onto the plastic profile outer side, wherein a reflection inner ring is arranged on the heating plate, wherein the reflection inner ring reflects the heat rays of the heating plate onto the plastic profile inner side.

17 Claims, 3 Drawing Sheets

REFLECTION INNER RING

CROSS-REFERENCE TO RELATED APPLICATIONS

This application claims the benefit and priority of EP 16 154 758.3 filed Feb. 9, 2016. The entire disclosure of the above application is incorporated herein by reference.

FIELD

The invention relates to a device for end-side welding of plastic profiles, preferably pipes, containing tensioning devices for retaining the plastic profiles in a coaxial position in relation to one another, a heating plate for generating heat rays for contact-free heating up of the plastic profile ends and a reflection outer ring for reflection of the heat radiation onto the plastic profile outer side.

SUMMARY

Devices for welding plastic profiles, wherein the heating of the plastic profile ends takes place in a contact-free manner, are known from the prior art and are often used in chemical and high-purity fields since high demands are made on the purity of the connection of the pipes there. As a result of this, a contact-free welding of the plastic profile ends is preferred.

DE 44 16 518 A1 discloses a corresponding device, wherein the infrared rays of the resistance heating element radiate through a protective plate composed of glass ceramic material to the pipes to be heated.

It is disadvantageous in this case that the heat radiation or infrared radiation only strike directly on the end side of the pipe end to be welded and as a result the heating into the depth of the pipe takes place unevenly and as a result optimum welding is not achieved during joining together of the pipe ends as a result of the uneven heating.

JP 3347903 also discloses a contact-free welding method for plastic pipes, wherein the heating mirror has a contour in the end sides which not only allows the heat rays to strike perpendicularly on the end side of the pipe, but also at an angle which in turn heats up the end side of the pipe end slightly more evenly.

It is disadvantageous in this case that here too the heat rays only strike the end side of the pipe end and do not reach slightly further into the depth of the pipe or the outer or inner diameter at the pipe end. Moreover, a corresponding heating mirror must be produced for each pipe diameter in order to ensure that the contour is at the correct location.

BACKGROUND

The object of the invention is to propose a device for end-side welding of plastic profiles, preferably pipes, which improves the weld seam or the inner bead as well as the outer bead of the weld seam and can be used for a wide range of different dimensions of plastic profiles.

This object is achieved according to the invention in that a reflection inner ring is arranged on the heating plate, wherein the reflection inner ring reflects the heat rays or IR rays of the heating plate onto the plastic profile inner side.

The device for end-side welding of plastic profiles, preferably pipes, includes tensioning devices for retaining the plastic profiles in a coaxial position in relation to one another. The tensioning devices are preferably arranged on a base plate, wherein at least one tensioning device can be displaced coaxially to the other in order to weld the plastic profile ends to one another.

A heating plate for contact-free heating of the plastic profile ends by means of heat rays is arranged between the tensioning devices in which the pipe ends are clamped. Heating cartridges which correspondingly heat the heating plate are preferably arranged in the heating plate. The heat rays, preferably IR rays, which are generated by the heated heating plate, strike the plastic profile ends, as a result of which they are heated. In order to ensure optimum heating of the plastic profile ends, a reflection outer ring is arranged around the heating plate. This serves to reflect the heat radiation or IR radiation of the heating plate onto its inner side and project it onto the outer lateral surface of the plastic profiles. This enables even heating up of the plastic profile ends and the heating is performed not only via the end side, but also via the outer lateral surface of the plastic profile ends.

A reflection inner ring is arranged on the heating plate so that improved and even heating of the plastic profile end from the inside can also be carried out. As a result of this, the heat radiation or the IR radiation which proceeds from the heating plate is reflected on the reflection inner ring and projected onto the inner contour or the inner lateral surface of the plastic profile ends or the plastic pipe ends. This enables even heating of the plastic profile ends which is the prerequisite for good welding. The heating plate is preferably formed as a round disc which has the advantage that the same heating plate can be used for a wide range of dimensions of plastic profiles or range of diameters of pipes. The heating cartridges can furthermore be arranged in the radial direction in the heating plate, preferably regularly.

The heating plate preferably has heating cartridges which are arranged distributed around and along the circumference in radially extending holes. As a result of the arrangement of the heating cartridges, the heating plate has a through-hole in the centre. This serves primarily to produce the heating plate or to incorporate the hole for the heating cartridges.

One advantageous configuration of the invention lies in the reflection inner ring being arranged in the through-hole of the heating plate. The plastic profile ends, preferably pipe ends, to be welded are aligned concentrically or coaxially to the reflection inner ring for heating, wherein the reflection inner ring projects into the inside of the plastic profiles or pipes and as a result the heat rays or the IR rays of the heating plate are reflected on the outer lateral surface of the reflection inner ring and strike the inner lateral surface of the plastic profile or pipe and thus support heating from the inside.

A reflection inner ring which is fastened only on the end sides of the heating plate and is not covered by a through-hole can of course also be imagined.

In order to achieve good reflection of the heat or IR rays, the reflection inner ring has a maximum roughness of 1.2 µm, in particular the bushings of the reflection inner ring.

The reflection inner ring is preferably produced from material which is capable of conducting heat, in particular the bushings.

The reflection inner ring furthermore brings with it the advantage that the through-hole in the heating plate, which is a result of production, is closed by the fitting of the reflection inner ring and air circulation can be avoided or prevented. As a result, undesired heat discharge does not take place.

The wall of the plastic profile ends is thus heated via the heat radiation which directly strikes the end sides of the plastic profiles from the heating plate as well as via the reflection outer ring which projects the heat radiation or IR radiation onto the outer circumference or the outer lateral surface of the plastic profiles and furthermore also via the reflection inner ring which also reflects the heat rays or IR rays of the heating plate and projects them onto the inner surface of the plastic profiles and even emits heat rays as a result of the heat absorbed by abutting on the heating plate.

The invention is also characterized in that the reflection inner ring is formed to have a changeable length. Since the width of the heating plate expands and contracts over and over again as a result of the heating and cooling, it is important that the reflection inner ring always follows the change in length and width. This means that if the heating plate expands as a result of heating, especially in terms of width or thickness, the reflection inner ring is correspondingly lengthened. If the opposite is the case, the reflection inner ring also contracts. As a result of this, the reflection inner ring is always guided in a fixed manner in the through-hole of the heating plate and precisely positioned. It is also advantageous if the reflection inner ring is in contact with the heating plate over a large surface area, thus producing good heat transmission.

The reflection inner ring has multiple parts. The reflection inner ring preferably contains two bushings. It has also been shown to be advantageous if the bushings are formed to be identical and are arranged in mirror symmetry to one another. It is also preferred if the bushings or one of its end sides touch the end sides of the heating plate. It has been shown to be a further advantageous configuration if the lateral surface of the through-hole of the heating plate is in direct contact with or touch the lateral surface of a cylinder region of the bushings.

In order to achieve the changeability in the length of the reflection inner ring, the reflection inner ring has tensioning elements which mutually tension the bushings. The reflection inner ring preferably has a bolt on which the bushings are arranged and are tensioned by means of tensioning elements.

The heating plate is arranged between the two bushings, wherein the bushings are mounted on the bolt and accommodate the change in length of the heating plate by means of tensioning elements.

DRAWINGS

An exemplary embodiment of the invention will be described on the basis of the figures, wherein the invention is not only restricted to the exemplary embodiment. In the figures.

DETAILED DESCRIPTION

Figure 1:
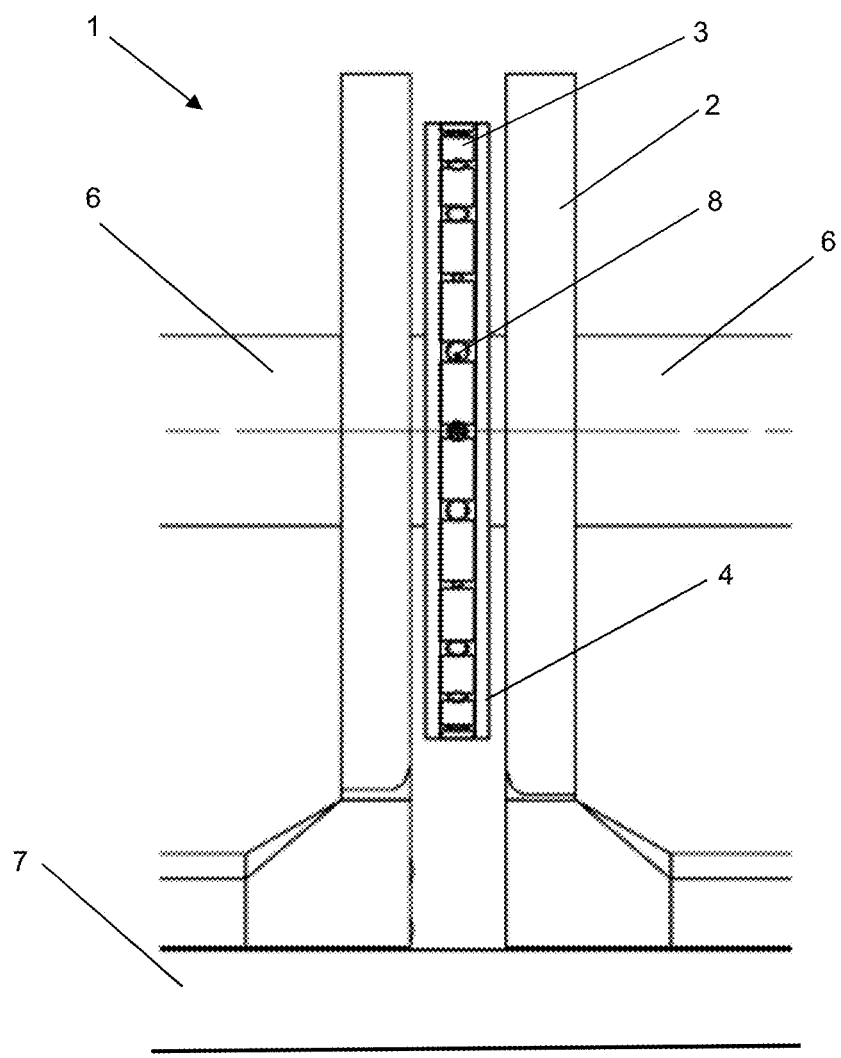
FIG. 1 shows a schematic view of a device according to the invention.

FIG. 1 shows a schematic view of a device 1 according to the invention for end-side welding of plastic profiles 6, preferably pipes, wherein the heating of plastic profile ends 6 is carried out in a contact-free manner.

Device 1 contains tensioning devices 2 which are arranged coaxially to one another. Tensioning devices 2 serves as a retaining device for plastic profiles 6. Tensioning devices 2 are preferably arranged on a base plate 7, wherein at least one of tensioning devices 2 can be displaced linearly to join together plastic profiles 6.

A heating plate 3 which serves to heat plastic profile ends 6 is arranged between tensioning devices 2. In order to heat heating plate 3, heat cartridges (not plotted) are arranged in heating cartridge holes 8, provided for this purpose, in heating plate 3, this being apparent from FIGS. 2 and 3.

In order to be able to cover a welded joint in a wide range of dimensions of plastic profiles with the same device 1, heating plate 3 preferably has a round shape, i.e. it is advantageous in terms of the arrangement of the heating cartridges and even heating if the heating plate is formed as a round disc. The heating cartridges preferably extend radially in heating cartridge holes 8 in heating plate 3, which enables a regular and star-shaped arrangement.

Device 1 furthermore has a reflection outer ring 4 which is arranged around heating plate 3, preferably concentrically. Reflection outer ring 4 is wider than heating plate 3 and projects in each case beyond both sides of heating plate 3. This enables the reflection of heat or IR rays of heating plate 3. This means that heat or IR rays 13 proceeding from heating plate 3 which strike the inner surface of reflection outer ring 4 are reflected there and projected onto the lateral outer surface of plastic profile 6, as a result of which plastic profile 6 or tube is also heated up from the outside. In order to optimize heating of plastic profile 6 by virtue of the fact that as even as possible heating takes place, heat rays or IR rays 13 are also projected onto the plastic profile inner side. This is achieved by reflection inner ring 5. Reflection inner ring 5 is arranged on heating plate 3 and reflects the heat rays or IR rays onto the inner lateral surface of plastic profile 6.

As a result of the production method of heating plate 3, heating plate 3 has a through-hole 9 in the centre. This serves primarily to attach radially running holes 8 for the heating cartridges. Holes 8 for the heating cartridges are preferably bored and subsequently countersunk, this not always being possible in the case of heating plates 3 which have larger dimensions, which is why a through-hole 9 which enables the escape of chips during boring and countersinking is arranged in the centre of heating plate 3.

Reflection inner ring 5 is arranged in through-hole 9 of heating plate 3, this having the advantage that through-hole 9 is closed and an air circulation which would discharge the heat can be prevented. Reflection inner ring 5 arranged concentrically in heating plate 3 preferably contains two bushings 10, wherein bushings 10 are preferably formed to be identical. Bushings 10 of reflection inner ring 5 are arranged in mirror symmetry to one another, as a result they can be optimally inserted into through-hole 9. Bushings 10 are preferably mounted on a bolt 11 which can be formed, for example, as a simple screw with nuts. In order to be able to accommodate the change in width of heating plate 3 as a result of its temperature changes, reflection inner ring 5 has tensioning elements 12 which make it possible for reflection inner ring 5 to change length and nevertheless still ensure that reflection inner ring 5 is arranged in a rotationally secured manner and without play in through-hole 9.

This means that heating plate 3 is heated and correspondingly expands in terms of the width or thickness, it pulls apart the two bushings 10 mounted on bolt 11, counter to the force of tensioning elements 12. If heating plate 3 cools again, if it also contracts in terms of its width and bushings 10 are thus also pushed together again, tensioning elements 12 push these together. It is thus ensured that reflection inner ring 5 behaves in accordance with the change in width of heating plate 3 and is guided in through-hole 9.

Figure 2:
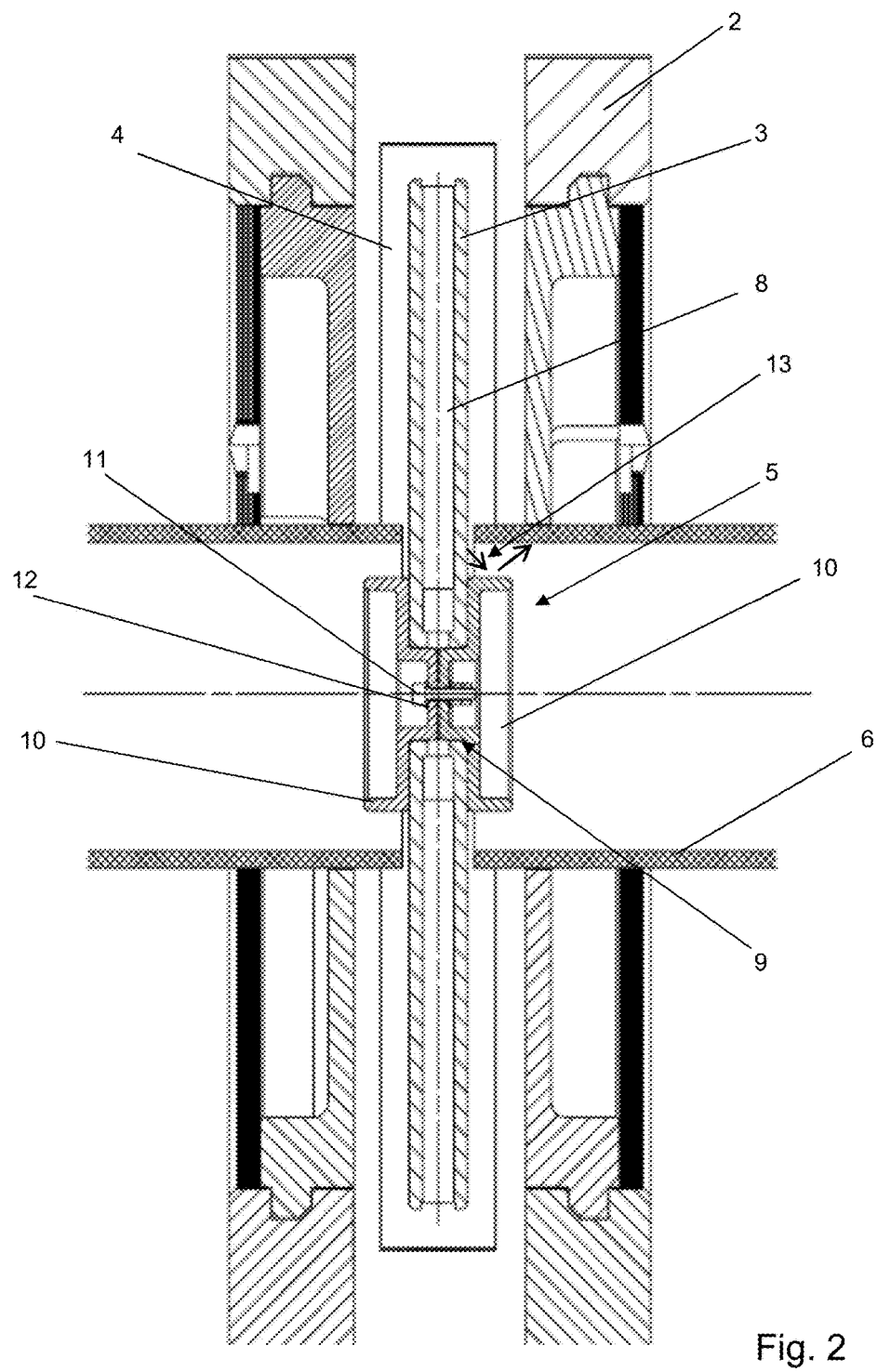
FIG. 2 shows a partial view through the heating plate with reflection inner ring and a clamped plastic profile end and FIG. 3 shows a three-dimensional view of a heating plate with reflection inner ring.
Figure 3:
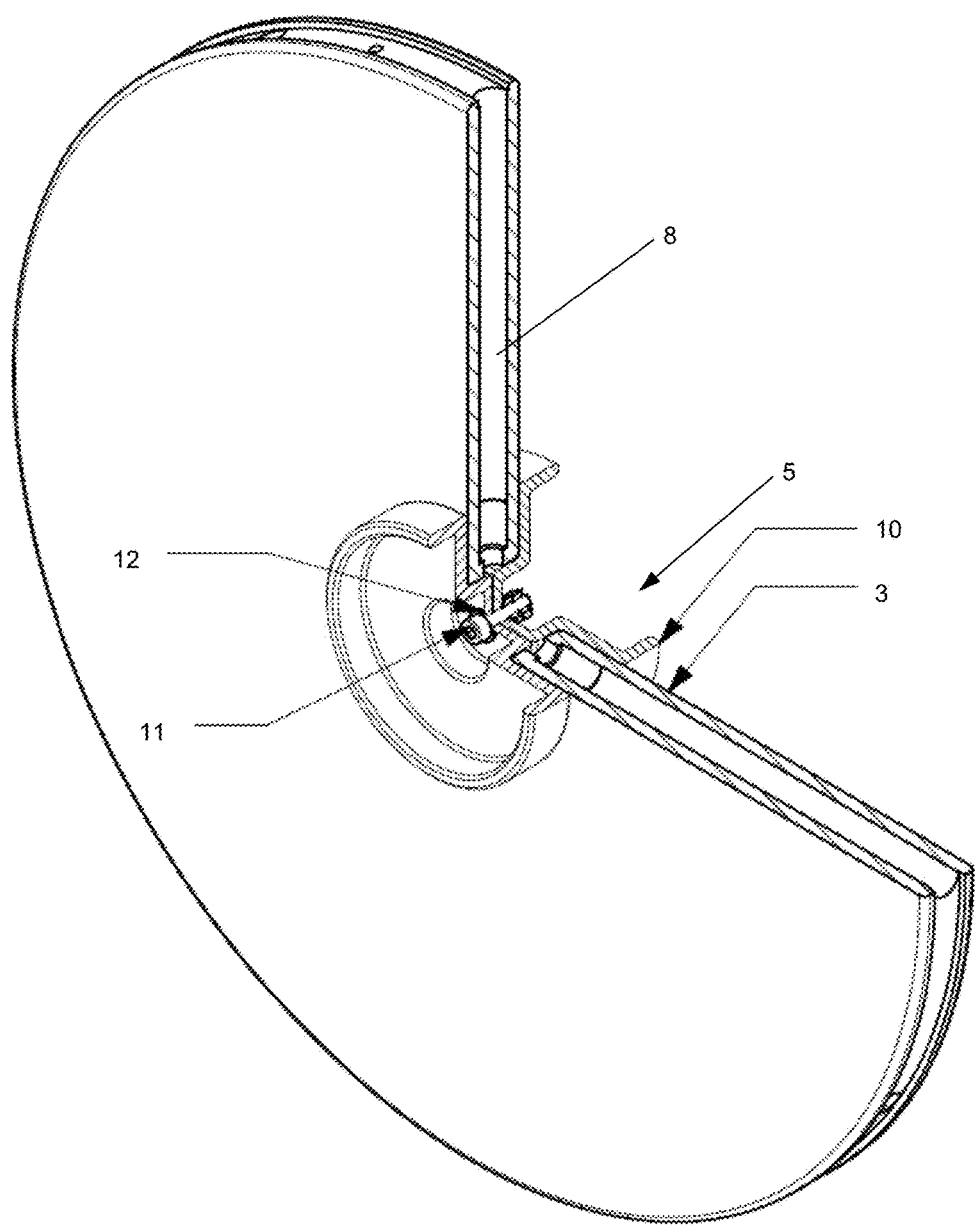

In FIG. 2, heat or IR rays 13 are represented by arrows which represent the reflection on the outer ring or on the outer lateral surface of reflection inner ring 5. Heat radiation 13 proceeding from heating plate 3 is reflected on reflection inner ring 5 and projected onto the inner lateral surface of plastic profile 6 or of the pipe. Plastic profile ends 6 are, as a result of the present invention, heated with heat rays or IR rays 13 which strike profile end 6 at the end side as well as via rays which heat the inner and outer lateral surface of plastic profile 6 as a result of the reflection on inner and outer reflection ring 4, 5. This produces even heating of profile end 6 which in turn produces a good bead and correspondingly a good welded joint.

LIST OF REFERENCE NUMBERS

1 Device
2 Tensioning device
3 Heating plate
4 Reflection outer ring
5 Reflection inner ring
6 Plastic profile/pipe
7 Base plate
8 Hole for heating cartridge
9 Through-hole
10 Bushing
11 Bolt
12 Tensioning element
13 Heat or IR rays

What is claimed is:

1. A device for end side welding of plastic profiles, each profile having an end, an outer side adjacent the end and an inner side adjacent the end, the device comprising:
    tensioning devices for retaining ends of two profiles in a coaxial position relative to one another;
    a disc-shaped heating plate for generating heat rays, the heating plate having a central axis;
    a reflection outer ring surrounding the heating plate;
    a reflection inner ring arranged on the heating plate about the central axis; and
    the tensioning devices being configured to retain ends of the profiles so that the inner ring is located inside of the inner sides of the profiles and the outer ring is located about the outer sides of the profiles, with the inner ring being configured to reflect heat rays from the heating plate onto inner sides of the profiles and the outer ring is configured to reflect heating rays from the heating plate onto outer sides of the profiles.

2. The device according to claim 1, wherein the heating plate has a through-hole in the center along the central axis, and wherein the heating plate has a round outer contour.

3. The device according to claim 2, wherein the reflection inner ring is arranged concentrically in the through-hole of the heating plate.

4. The device according to claim 1, wherein the reflection inner ring is capable of conducting heat.

5. The device according to claim 4, wherein the reflection inner ring comprises two bushings that are connected to one another with a changeable length by means of bolts and tensioning elements.

6. The device according to claim 1, wherein the reflection inner ring is configured have a changeable length.

7. The device according to claim 1, wherein the reflection inner ring has a maximum roughness Ra 1.2 µm.

8. The device according to claim 1, wherein the reflection inner ring has two bushings.

9. The device according to claim 1, wherein the reflection inner ring has tensioning elements.

10. A device comprising a heating plate for generating heat rays for contact-free heating of plastic profiles for end-side welding, each profile having an end, an outer side adjacent the end and an inner side adjacent the end, a reflection inner ring having an outer reflective surface with a diameter less than an inner diameter of the inner side of the profile, the reflection inner ring being arranged on the heating plate, and wherein the outer reflective surface of the reflection inner ring reflects the heat rays of the heating plate onto the plastic profile inner side.

11. The device according to claim 10, wherein the heating plate has a through-hole in the center.

12. The device according to claim 11, wherein the reflection inner ring is arranged concentrically in the through-hole of the heating plate.

13. The device according to claim 10, wherein the reflection inner ring has a maximum roughness Ra 1.2 µm.

14. The device according to claim 10, wherein the reflection inner ring has two bushings.

15. The device according to claim 10, wherein the reflection inner ring has tensioning elements.

16. The device according to claim 10, wherein the reflection inner ring is capable of conducting heat.

17. The device according to claim 16, wherein the reflection inner ring comprises two bushings that are connected to one another with a changeable length by means of bolts and tensioning elements.

* * * * *